Patented July 22, 1952

2,604,453

UNITED STATES PATENT OFFICE 2,604,453

NEW COPOLYMER COMPOSITIONS

Alexander H. Popkin, New York, N. Y., assignor to Standard Oil Development Company, a corporation of Delaware No Drawing. Application December 30, 1948, Serial No. 68,373

2 Claims. (Cl. 252—56)

This invention relates to novel copolymeric materials and to methods of using the same. It relates also to oil compositions and the like containing such products. More particularly, it relates to high molecular weight copolymers of acrylic acid esters of alcohols having a chain length in excess of 6 carbon atoms and polymerizable organic compounds containing a $CH_2=C<$ group having less than 6 carbon atoms. These novel polymeric materials are especially useful for improving the viscosity index and pour point of lubricating oils.

One object of the present invention is the production of a V. I. improver of high potency in a wide variety of lubricating oils. A further object of the invention contemplates the use of these novel esterified copolymers as V. I. improvers in synthetic lubricating oils of the polyether or polyester types.

It is already known that acrylate and methacrylate esters of aliphatic alcohols having eight carbon atoms or more can be polymerized to make high molecular weight products which are soluble in lubricating oils and are capable of improving viscosity-temperature characteristics of said oils. Such compositions are covered generally in U. S. Patent 2,020,714 which broadly discloses vinyl compounds containing oxygen. It is also known that alkyl acrylate and methacrylate esters which are made from alcohols containing six or less carbon atoms yield polymers which are generally insoluble in lubricating oil. The methacrylate polymers are somewhat superior to acrylate polymers with respect to viscosity index improving properties and constitute the active component of a commercially available viscosity index improver.

It has now been discovered that materials having exceptionally high viscosity index-improving potency may be obtained by copolymerizing acrylic acid esters, obtained from alcohols having chain length varying from 8 to 18 carbon atoms, with low molecular weight monomers containing a vinyl group. According to the preferred embodiments of the invention, products are made which are extremely effective viscosity index improvers in mineral lubricating oils. An additional advantage of the present invention is that, the copolymers are considerably more effective as viscosity index improvers than single acrylate polymers having the same average side chain length.

Broadly, the invention comprises copolymerizing an alkyl acrylate having an ester group containing from 8 to 18 carbon atoms and a low molecular weight monomer or mixtures thereof having the general formula

wherein X is an alkyl group containing from 1 to 4 carbon atoms and Y represents a related group of radicals such as

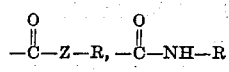

$-OOC-CH_3$, $-C\equiv N$, Z being an element of group 6 of the periodic table, preferably oxygen or sulfur and R is an alkyl group containing from 1 to 4 carbon atoms. It is fully within the comprehension of this invention to use mixtures of either of the above-mentioned component monomers.

Among the specific high molecular weight components of the copolymeric material claimed by the applicant are: acrylic acid esters prepared from alcohols containing from 8 to 18 carbon atoms, particularly, octyl acrylate, decyl acrylate, lauryl acrylate, tetradecyl acrylate, and the like. Of particular interest from the point of view of availability and low cost are acrylate ester made from alcohols which are the products of the reaction of $C_7$, $C_8$, $C_9$, $C_{12}$ and related olefins with carbon monoxide and hydrogen in the "oxo" process and alcohols made directly from carbon monoxide and hydrogen in a modified hydrocarbon synthesis. It will be understood that the acrylate esters contemplated as the high molecular weight component of the copolymeric material can be prepared from straight chained or branch-chained alcohols and, although primary saturated alcohols are preferred it is fully within the scope of this invention to use secondary alcohols or unsaturated alcohols in the ester synthesis.

The vinyl-containing low molecular weight active monomer described above in a generalized formula contemplates vinyl-containing materials wherein the alpha-carbon of the vinyl group may be alkyl-substituted to obtain methyl, ethyl, propyl, isopropyl, butyl or amyl substituents thereof. The vinyl group may be placed on either side of the carboxyl group, that is to say, both acrylic acid esters and vinyl esters of alkyl carboxylic acids are within the scope of the invention. Both esters and thioesters react satisfactorily to obtain the desired copolymer. Unsaturated nitriles such as acrylonitrile or alkylated acrylonitriles, such as methacrylonitrile can be used as the low molecular weight component of the copolymer.

The proportions of the low molecular weight vinyl-containing monomers may vary from about 1 to 50% by weight, depending on the chain length of the high molecular weight ester component of the copolymer and on the average side chain length desired. In this invention it has been noted that copolymers having an average side-chain length in excess of about 12 are not exceptional V. I. improvers, and furthermore that those having an average side chain length below about 7.2 carbons are generally insoluble in oil at temperatures of 15° F. or lower. It will be understood that the alcohol portions of the ester monomers appear as side chains in the copolymer, and oil-solubility depends on average side chain length. For this reason the limiting quantity of methyl acrylate which may be used in copolymerization with lauryl acrylate is slightly above 20 weight per cent of methyl acrylate, since higher quantities of methyl acrylate, such as 25 weight per cent and 30 weight percent copolymerized with lauryl acrylate will result in insoluble copolymers. Another example is the copolymerization of an octyl acrylate with methyl acrylate wherein the limit of weight per cent of methyl acrylate in the copolymer is about 4, since octyl acrylate copolymers composed of 5 weight per cent or greater of methyl acrylate are generally insoluble in oil at temperatures of 15° F. or lower.

In carrying out the copolymerization step, a suitable procedure is to mix the desired high molecular weight acrylate with the vinyl compound or mixture thereof in the desired proportions and add thereto a small amount of a suitable catalyst, for example, a peroxide such as benzoyl peroxide, acetyl peroxide, cumene peroxide, tertiary-butyl hydroperoxide and the like, in concentrations ranging from 0.1% to 3% and then heating the mixture to effect the desired copolymerization. Suitable temperatures may range from about 40° to 100° C. but higher temperatures may be used. A preferred method of carrying out the copolymerization is to do it in the presence of a solvent such as hydrocarbon liquids including toluene, heptane, and the like, heavier hydrocarbon oils, such as refined kerosene gas oil or a lubricating oil fraction or oxygen-containing solvents, such as alcohols, ethers and the like. If a volatile solvent is used during the copolymerization, it may be removed after completion of the reaction by any suitable means, such as distillation, evaporation and the like. Emulsion copolymerization is also within the contemplation of this invention.

The objects and the advantages of the invention will be better understood from a consideration of the following experimental data wherein several series of copolymers falling within the scope of the present invention were prepared and tested for viscosity index improving potency. The copolymers were prepared by combining the required quantities of the monomers in a suitable mineral oil diluent, wherein the total monomer concentration in the diluent ranged from 40 to 60 weight per cent. The reaction mixture was present in a suitable reactor equipped with stirrer, reflux condenser and heating unit. The reaction system was flushed with nitrogen, the temperature of the reaction mixture raised to about 70° C., and a suitable amount of peroxide catalyst added. The polymerization was generally completed in 10 to 30 hours reaction time although acceptable products were frequently obtained as early as five hours after copolymerization was initiated.

One series of copolymers prepared in this invention were copolymers of decyl and lauryl acrylate with various proportions of methyl acrylate and methyl methacrylate. These products were dissolved in various weight per cent blends in a Mid-Continent base oil having 117 V. I. and a viscosity of 45.1 S. U. S./210° F. Inspection data on the resulting blends are shown in Table I.

TABLE I

*V. I. improving potency of acrylate ester copolymers*

| Copolymer Composition, Weight Percent | Vis./210° F. S. U. S. 20% in test oil of 43 S. U. S./210° F. | Polymer Blend in Mid-Continent Oil | | |
|---|---|---|---|---|
| | | Weight Percent Polymer | Vis./210° F. S. U. S. | V. I. |
| Decyl Acrylate 85% <br> Methyl Acrylate 15% | 319 | 3.6 | 61.4 | 154 |
| Decyl Acrylate 85% <br> Methyl Acrylate 15% | 319 | 2.4 | 55.1 | 149 |
| Decyl Acrylate 75% <br> Methyl Acrylate 25% | (¹) | | | |
| Lauryl Acrylate 80% <br> Methyl Acrylate 20% | 404 | 3.6 | 65.7 | 153.3 |
| Lauryl Acrylate 70% <br> Methyl Acrylate 30% | (¹) | | | |
| Lauryl Acrylate 80% <br> Methyl Methacrylate 20% | 507 | 3.6 | 64.7 | 149 |
| Octyl Acrylate | ² 500 | 2.4 | 61.4 | 142 |
| Commercial Methacrylate Ester V. I. Improver | 650 | 3.6 | 71.0 | 147 |
| Commercial Methacrylate Ester V. I. Improver | 650 | 2.4 | 61.4 | 144 |

¹ Insoluble in Mid-Continent oil.
² Estimated value.

It may be seen from the data in Table I that a particular feature of the copolymers prepared in accordance with the present invention is that they combine the advantage of high V. I. improving potency with that of low thickening power, in this regard being superior to a methacrylate ester polymer of the same average side-chain length even though the latter is of higher molecular weight, as evidenced by the viscosity of the 20% concentrate in a mineral base and should therefore have higher V. I. improving potency. The acrylate ester copolymers of this invention also have higher V. I. improving potency than acrylate ester polymers of the same average side-chain length or methacrylate ester polymers of about the same average side-chain length. For example, the copolymer composed of 80% by weight of lauryl ($C_{12}$) acrylate and 20% by weight of methyl ($C_1$) acrylate having an average alcohol side chain length of about $C_8$ is more effective in V. I. improving power than an octyl ($C_8$) acrylate polymer, even though the latter is considerably higher in molecular weight than the copolymer as evidenced by the higher viscosities at 210° F. of the 20% blends in a mineral oil. The same superiority in V. I. improving power is noted for a copolymer composed of 85% by weight of decyl acrylate and 15% by weight of methyl acrylate having an average side-chain length of about $C_8$.

It will be noted that the enhanced V. I. improving potency obtained by copolymerizing a high molecular weight acrylate ester with a low molecular weight vinyl compound as proposed in this invention is evidenced even when the vinyl compound is present in relatively low concentrations in the copolymer. For example, a copolymer of 98% of $C_8$ oxo acrylate and 2% of methyl acrylate or a copolymer of 95% of $C_8$ oxo acrylate and 5% of methyl acrylate has higher V. I. improving potency than a polymer of a $C_8$ oxo acrylate ester. This is illustrated by the data in Table II.

TABLE II

V. I. improving properties of $C_8$ oxo acrylate copolymers

| Copolymer Composition Weight Per cent | Vis./210° F. SUS 20% in test Oil of 43 SUS/210° F. | 3.6 weight per cent Polymer in Base Oil | | | |
|---|---|---|---|---|---|
| | | V. I. | Vis./ 210° F. SUS | Actual Vis./ 15° F. SUS | Ratio Actual Extrapolated 15° F. Vis. |
| None | | 117 | 45.1 | 2,820 | |
| $C_8$ Oxo Acrylate 98% Methyl Acrylate 2% | 356 | 146.3 | 61.5 | 3,570 | 1.05 |
| $C_8$ Oxo Acrylate 95% Methyl Acrylate 5% | ¹342 | 148.6 | 54.6 | 3,510 | 1.37 |
| $C_8$ Oxo Acrylate 92% Methyl Acrylate 8% | (¹,²) | | | | |
| $C_8$ Oxo Acrylate | 329 | 142 | 60.8 | 4,600 | 1.12 |
| Commercial Methacrylate Ester Polymer V. I. Improver | 336 | 145.5 | 61.6 | 4,358 | 1.23 |

¹ Hazy blend; copolymer on borderline of solubility
² Copolymer insoluble

It will be noted that a blend of the copolymer composed of 98 weight per cent of $C_8$ oxo acrylate and 2 weight per cent of methyl acrylate has better low temperature viscosity characteristics than the corresponding blend of the commercial methacrylate ester polymer V. I. improver as evidenced by the actual viscosity S. U. S. at 15° F. and by the ratio of the actual viscosity at 15° to the extrapolated viscosity at 15° F., which is obtained by extrapolating through 100° F. and 210° F. viscosities on the A. S. T. M. chart D341–37T. The high ratio of actual to extrapolated viscosity at 15° F. for the copolymer composed of 95% weight per cent $C_8$ oxo acrylate and 5 weight per cent of methyl acrylate probably is further indication that this copolymer is approaching oil insolubility. Lesser amounts of the short chain acrylate is therefore preferred.

Copolymers of $C_8$ oxo acrylate with ethyl acrylate, with butyl acrylate or with butyl methacrylate of side-chain length varying from about $C_{7.9}$ to about $C_{7.2}$ were also prepared and tested for V. I. potency. The data are shown in Table III.

TABLE III

V. I. improving properties of $C_8$ oxo acrylate copolymers

| Copolymer Composition, Weight Per Cent | Vis./210° F. S. U. S., 20% in test oil of 43 SUS/ 210° F. | 3.6 Weight Per Cent Polymer in Base Oil | |
|---|---|---|---|
| | | Vis./210° F. S. U. S. | V. I. |
| $C_8$ Oxo Acrylate, 98% Ethyl Acrylate, 2% | 347 | 62.1 | 144.3 |
| $C_8$ Oxo Acrylate, 95% Ethyl Acrylate, 5% | 323 | 60.7 | 145.6 |
| $C_8$ Oxo Acrylate, 88% Ethyl Acrylate, 12% | (¹) | | |
| $C_8$ Oxo Acrylate, 98% Butyl Acrylate, 2% | 349 | 62.5 | 144 |
| $C_8$ Oxo Acrylate, 95% Butyl Acrylate, 5% | 337 | 62.3 | 144.5 |
| $C_8$ Oxo Acrylate, 92% Butyl Acrylate, 8% | 311 | 60.8 | 145 |
| $C_8$ Oxo Acrylate, 80% Butyl Acrylate, 20% | (¹) | | |
| $C_8$ Oxo Acrylate, 95% Butyl Methacrylate 5% | 339 | 62.1 | 144 |
| $C_8$ Oxo Acrylate | 329 | 60.8 | 142 |

¹ Insoluble in base oil.

It will be observed from the data in Table III that the $C_8$ oxo acrylate-ethyl acrylate copolymers, the $C_8$ oxo acrylate-butyl acrylate copolymers and the $C_8$ oxo acrylate-butyl methacrylate copolymers are decidedly better viscosity index improvers than the straight $C_8$ oxo acrylate polymer. The copolymers of this invention are generally employed to improve viscosity index of oils in concentrations as low as 0.1% and as high as 15% by weight, the range 0.5 to 5.0% being preferred.

The copolymers may also be used as constituents of lubricating greases or as modifiers for wax or for improving agents for asphalts, resins, gums, rubbers, synthetic rubbers, or various synthetic plastics and the like. They may also be used as gelling agents for gasoline and oil, in which case more than normally soluble amounts of the copolymer may be dissolved in the liquid base stock at elevated temperature and then cooled to form a gel.

What is claimed is:

1. A composition consisting essentially of a mineral oil base stock and from 0.1% to 15% by weight based on total composition of a copolymer of 80% to 95% lauryl acrylate and 20% to 5% methyl acrylate, said copolymer having an average side chain length in the range of 7.5 to 10.6 carbon atoms, said composition having a viscosity index substantially greater than that of said mineral oil.

2. A composition consisting essentially of a mineral oil base stock and from 0.1 to 15% by weight based on total composition of a copolymer of 80% lauryl acrylate and 20% methyl acrylate, said copolymer being characterized by the presence of an alkyl side chain having an average length of 7.5 carbon atoms, said composition having a viscosity index substantially greater than that of said mineral oil.

ALEXANDER H. POPKIN.

REFERENCES CITED

The following references are of record in the file of this patent:

UNITED STATES PATENTS

| Number | Name | Date |
| --- | --- | --- |
| 2,097,263 | Strain | Oct. 26, 1937 |
| 2,125,885 | Bruson | Aug. 9, 1938 |
| 2,270,024 | Reufrew et al. | Jan. 13, 1942 |
| 2,403,267 | Davis | July 2, 1946 |
| 2,407,954 | Fenske et al. | Sept. 17, 1946 |
| 2,412,476 | Semegen | Dec. 10, 1946 |

FOREIGN PATENTS

| Number | Country | Date |
| --- | --- | --- |
| 487,593 | Great Britain | June 22, 1938 |
| 492,734 | Great Britain | 1938 |
| 818,740 | France | June 1937 |